(12) United States Patent
Sitko et al.

(10) Patent No.: US 12,152,674 B2
(45) Date of Patent: Nov. 26, 2024

(54) ELECTRICALLY GROUNDING CASSETTE SEAL

(71) Applicant: TRELLEBORG SEALING SOLUTIONS US, INC., Ft. Wayne, IN (US)

(72) Inventors: Mark C. Sitko, Fort Wayne, IN (US); Rutuja S. Joshi, Palatine, IL (US)

(73) Assignee: TRELLEBORG SEALING SOLUTIONS US, INC., Ft. Wayne, IN (US)

( * ) Notice: Subject to any disclaimer, the term of this patent is extended or adjusted under 35 U.S.C. 154(b) by 57 days.

(21) Appl. No.: 17/448,933

(22) Filed: Sep. 27, 2021

(65) Prior Publication Data

US 2022/0099187 A1     Mar. 31, 2022

Related U.S. Application Data

(60) Provisional application No. 63/084,120, filed on Sep. 28, 2020.

(51) Int. Cl.
*F16J 15/3256* (2016.01)
*F16C 33/78* (2006.01)
*F16J 15/3232* (2016.01)

(52) U.S. Cl.
CPC ....... *F16J 15/3256* (2013.01); *F16C 33/7883* (2013.01); *F16J 15/3232* (2013.01)

(58) Field of Classification Search
CPC .. F16J 15/3232; F16J 15/3248; F16J 15/3252; F16J 15/3256; F16J 15/3264;
(Continued)

(56) References Cited

U.S. PATENT DOCUMENTS 4,721,312 A    1/1988  Hornberger
5,139,425 A *  8/1992  Daviet ................. F16C 41/002
                                                        384/477
(Continued)

FOREIGN PATENT DOCUMENTS

CN    111577769 A    8/2020
EP    1 096 187 A2   5/2001
(Continued)

*Primary Examiner* — Nicholas L Foster
(74) *Attorney, Agent, or Firm* — Orbit IP, LLP; Marc G. Martino

(57) ABSTRACT

A cassette seal is configured to seal a shaft within a housing. A shaft casing is annularly-shaped about a longitudinal axis and is configured to fixedly attach to the shaft, where the shaft casing is electrically conductive and configured to be in electrical conductivity with the shaft when attached to the shaft. A housing casing is annularly-shaped about the longitudinal axis and is configured to fixedly attach to the housing, where the housing casing is electrically conductive and configured to be in electrical conductivity with the housing when attached to the housing. A seal is disposed between the shaft and housing casing. At least one cantilevered flexural finger is attached fixedly attached to either the shaft casing or the housing casing and then in rotating abutment with the other. The at least one cantilevered flexural finger is electrically conductive and electrically connects the shaft casing to the housing casing.

24 Claims, 9 Drawing Sheets

(58) Field of Classification Search
CPC ............... F16J 15/3268; F16J 15/3284; F16C 33/7879; F16C 33/7883
See application file for complete search history.

(56) References Cited

U.S. PATENT DOCUMENTS

| | | | |
|---|---|---|---|
| 5,201,528 A | 4/1993 | Upper | |
| 7,498,703 B2 | 3/2009 | Rea et al. | |
| 7,521,827 B2 | 4/2009 | Orlowski et al. | |
| 8,770,848 B2* | 7/2014 | Koma | F16J 15/064 |
| | | | 384/589 |
| 8,992,091 B2 | 3/2015 | Cudrnak et al. | |
| 9,175,728 B2* | 11/2015 | White | F16C 33/4605 |
| 9,464,672 B2* | 10/2016 | White | F16C 33/46 |
| 9,581,203 B2* | 2/2017 | White | F16C 33/62 |
| 9,790,995 B2* | 10/2017 | White | F16C 41/002 |
| 10,161,522 B2* | 12/2018 | Colineau | F16J 15/064 |
| 10,190,690 B2* | 1/2019 | Colineau | F16J 15/3232 |
| 10,612,599 B2* | 4/2020 | White | F16C 33/7856 |
| 11,359,724 B2* | 6/2022 | Wagner | F16J 15/3204 |
| 11,493,133 B2* | 11/2022 | Stöhr | F16J 15/064 |
| 2002/0121821 A1 | 9/2002 | Ritter | |
| 2011/0129176 A1* | 6/2011 | Koma | F16C 33/7879 |
| | | | 384/484 |
| 2014/0203514 A1* | 7/2014 | Colineau | F16J 15/064 |
| | | | 277/549 |
| 2014/0334758 A1* | 11/2014 | White | F16C 33/7843 |
| | | | 384/477 |
| 2014/0369821 A1 | 12/2014 | Finck | |
| 2016/0010750 A1* | 1/2016 | Colineau | F16J 15/3232 |
| | | | 277/575 |
| 2016/0215824 A1* | 7/2016 | Gezault | F16J 15/064 |
| 2017/0261107 A1 | 9/2017 | Martin et al. | |
| 2018/0313449 A1* | 11/2018 | Dahlhaus-Preussler | |
| | | | F16J 15/322 |
| 2020/0080597 A1* | 3/2020 | White | F16C 41/002 |
| 2020/0292079 A1 | 9/2020 | Ito et al. | |
| 2021/0003220 A1* | 1/2021 | Stöhr | F16J 15/064 |
| 2021/0115974 A1* | 4/2021 | Schamin | F16C 41/002 |
| 2021/0180698 A1* | 6/2021 | Wagner | F16J 15/3252 |
| 2022/0107016 A1* | 4/2022 | Griesbach | F16H 57/029 |
| 2022/0247284 A1* | 8/2022 | Bantz | H02K 11/40 |

FOREIGN PATENT DOCUMENTS

| | | |
|---|---|---|
| EP | 2 301 766 B1 | 5/2014 |
| JP | 2015-135156 A | 7/2015 |
| WO | 2015/086096 A1 | 6/2015 |
| WO | 2020/021940 A1 | 1/2020 |

* cited by examiner

ELECTRICALLY GROUNDING CASSETTE SEAL

CROSS-REFERENCE TO RELATED APPLICATIONS

This non-provisional patent application claims priority to provisional patent application 63/084,120 filed Sep. 28, 2020, the entire contents of which are hereby incorporated in full by this reference.

DESCRIPTION

Field of the Invention

The present invention generally relates to cassette seals. More particularly, the present invention relates to a cassette seal that is able to electrically ground (i.e. electrically connect) the shaft and the housing assembly.

Background of the Invention

A cassette seal is a fully enclosed seal that is able to perform as an all-in-one oil seal, wear sleeve and dust protector. Cassette seals are suitable for heavy-duty applications. Depending on the material, cassette seals can operate in very cold temperatures or very hot temperatures.

FIG. 1 is a cross-section of an embodiment of a cassette seal 10A developed primarily for rotating wheel hubs in heavy-duty vehicles such as off-road trucks. The ID (inner diameter) of the seal is mounted onto the stationary shaft and the OD (outer diameter) is pressed into the rotating bore of the hub, creating a fully enclosed seal. In this way, dirt and contamination are effectively sealed out, while lubrication is retained. The rubber ID provides a firm positive seal on the shaft, yet allows it to be easily installed.

FIG. 2 is a cross-section of another embodiment of a cassette seal 10B that was specially developed for off-highway machines and vehicles. The design not only improves water and dirt exclusion, but also its ability to operate with eccentricities, over-pressure and shaft misalignment. With two sealing lips equipped with compression springs, this cassette seal provides exceptional sealing performance, and offers double the lifetime of other system seals.

FIG. 3 is a cross-section of another embodiment of a cassette seal 10C that distinguishes itself through its inverted design, meaning the sealing element is fixed and the casing components rotate with the shaft. In this way, the cassette seal integrates the necessary shaft counterface as well as the dirt exclusion. This is the reason why it can prevent road dirt from entering the system while preventing oil leakage.

It is understood by those skilled in the art when viewing FIGS. 1-3 that each design would be rotated about a longitudinal axis (i.e. center axis), such that the cassette seal would form an annularly-shaped structure (i.e. ring-shaped).

FIG. 4 is a cross-sectional perspective view of another embodiment of a cassette seal 10D, where now the ring-shape is more apparent. The stacked design 11 allows more room to add components and permits a much larger volume of grease between the lips, which serves as a barrier to contamination. The metal/rubber outer diameter 12 gives a positive static seal, but still allows dissipation of heat from the contaminant lip. The metal cases 13 have been designed in such a way that no crimping is needed to keep them together, allowing for cost effective manufacturing. The step 14 in the outside of the metal adds stability to prevent deformation during assembly. The oil-facing lip 15 is open to oil, which allows a cooling flush of oil during operation. The axial lip 16 is also open to allow contaminants to flush out, preventing them from packing around the lip. The applicant has developed a new bonding method that leaves a fine finish 17 on the riding surfaces, so grinding is not necessary. The oil seal lip design 18 is based on the applicant's world class design standards, which demonstrate superior sealing capabilities.

FIG. 5 is a simplistic cross-sectional view of the structure that a cassette seal would be disposed within. A shaft 20 spins about a longitudinal axis 21. A housing 22 has an annularly-shaped countersink (bore) 23 that the cassette seal would be disposed within. The shaft has an outer diameter 24 and the countersink (bore) has an outer diameter 25.

In light of the cassette seals already taught herein, a significant percentage of an electrical motor's failure is due to bearing failures. Most often these premature failures of the motors operated by VFD (variable frequency drive) occur due to detrimental effects of shaft voltage resulting in bearing current. Electrical bearing damage is a lurking problem in electric cars like many other industries such as the HVAC industry, the pulp and paper industry and many others.

Unless mitigation for these shaft voltages is employed in the motor, the motor's bearings may become damaged from electrical bearing currents which cause pitting and excessive bearing noise, fluting and finally motor failure. Accordingly, there is a need for a cassette seal that can reduce and/or eliminate the damage caused to bearings from electrical currents. The present invention fulfills these needs and provides other related advantages.

SUMMARY OF THE INVENTION

The present invention is meant to be used in electric motors for grounding shaft currents. A finger-like feature electrically connects a shaft casing and a housing casing of the cassette seal. This arrangement allows a low resistant path for the shaft to ground instead of the ball bearings. The present invention may comprise finger-like features with varied lengths through the circumference contacting the static portion of the seal to reduce the wear of the static portion at any one region. Furthermore, conductive grease could be applied between those fingers for additional lubrication and increased electrical conductivity. The present invention could be attached to the metal casing by rivets, fasteners, bonding and the like. The present invention allows a single component, that being the cassette seal, for dual function of sealing and grounding. This leads to increased reliability of the seal and associated bearings while achieving a lower overall cost.

More specifically, one embodiment of the present invention is a cassette seal (30) for sealing a shaft (20) within a housing (22), where either the shaft rotates relative to the housing or the housing rotates relative to the shaft about a longitudinal axis (21). The cassette seal is mutually defining and annularly-shaped about the longitudinal axis. The cassette seal comprises: a shaft casing (31) (i.e. first structural member) annularly-shaped (i.e. ring-shaped) about the longitudinal axis configured to fixedly attach to the shaft, wherein the shaft casing is electrically conductive and configured to be in electrical conductivity with the shaft when attached to the shaft; a housing casing (34) (i.e. second structural member) annularly-shaped (i.e. ring-shaped) about the longitudinal axis configured to fixedly attach to the housing, wherein the housing casing is electrically conductive and configured to be in electrical conductivity with the housing when attached to the housing; at least one seal (38) disposed between the shaft casing and the housing casing, the at least one seal fixedly attached to either the shaft casing or the housing casing and then in rotating abutment with the other, the at least one seal configured to separate an oil side of the cassette seal from an air side of the cassette seal; and at least one cantilevered flexural finger fixedly attached to either the shaft casing or the housing casing and then in rotating abutment with the other, wherein the at least one cantilevered flexural finger is electrically conductive and electrically connects the shaft casing to the housing casing.

In other exemplary embodiments, the shaft casing and the housing casing may be metallic, such as steel, stainless steel or carbon steel.

In other exemplary embodiments, the at least one cantilevered flexural finger may comprise an electrically conductive metal such as brass, an electrically conductive plastic or an electrically conductive rubber. The at least one cantilevered flexural finger may comprise a plurality of cantilevered flexural fingers disposed about the longitudinal axis where the plurality of cantilevered flexural fingers extend outwardly from a common annular ring (41). The common annular ring may be attached to either the shaft casing or the housing casing by bonding, fasteners, rivets or an interference fit (46).

In other exemplary embodiments, at least two different cantilevered flexural fingers of the plurality of cantilevered flexural fingers may comprise different lengths.

In other exemplary embodiments, an electrically conductive grease may be disposed between the plurality of cantilevered flexural fingers.

In other exemplary embodiments, the housing casing and/or the shaft casing may be made from more than one casing assembled together.

In other exemplary embodiments, the at least one cantilevered flexural finger may be disposed between the shaft casing and the housing casing.

In other exemplary embodiments, the at least one cantilevered flexural finger may be disposed within the cassette seal and not visible from an outside of the cassette seal.

In other exemplary embodiments, the shaft casing may comprise a first annularly-shaped portion (32) extending (horizontally in the figure) at least partially along (i.e. aligned with) the longitudinal axis and a second annularly-shaped portion (33) extending (vertically in the figure) at least partially perpendicular to the longitudinal axis.

In other exemplary embodiments, the housing casing may comprise a first annularly-shaped portion (35) extending (horizontally in the figure) at least partially along (i.e. aligned with) the longitudinal axis, a second annularly-shaped portion (36) extending (vertically in the figure) at least partially perpendicular to the longitudinal axis, and a third annularly-shaped portion (37) extending (vertically in the figure) at least partially perpendicular to the longitudinal axis, wherein the second annularly-shaped portion of the housing casing is disposed adjacent to the air side of the cassette seal and the third annularly-shaped portion of the housing casing is disposed adjacent to the oil side of the cassette seal, and wherein the second annularly-shaped portion of the shaft casing is disposed between the second and third annularly-shaped portions of the housing casing. The at least one cantilevered flexural finger may be disposed between the first annularly-shaped portions of the housing casing and shaft casing and may also be disposed between the second annularly-shaped portion of the shaft casing and the third annularly-disposed housing casing. The at least one cantilevered flexural finger may be disposed between the first annularly-shaped portions of the housing casing and shaft casing and may also be disposed between the second and the third annularly-disposed housing casings.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
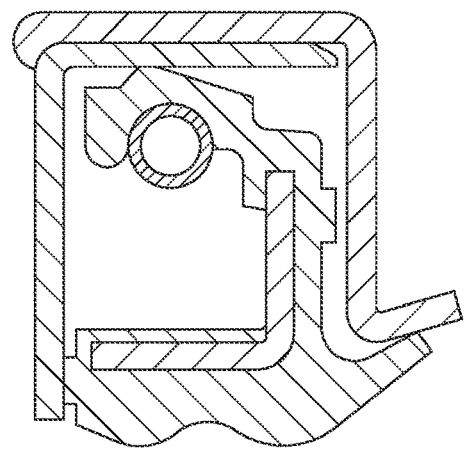
FIG. 1 is a cross section of an embodiment of a cassette seal.
Figure 2:
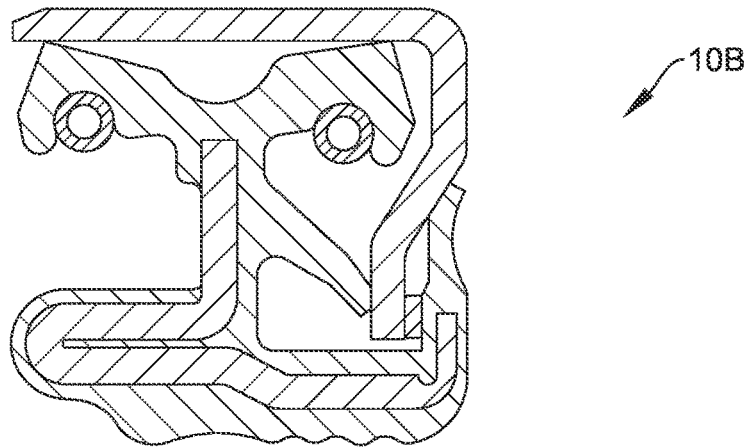
FIG. 2 is a cross section of another embodiment of a cassette seal.
Figure 3:
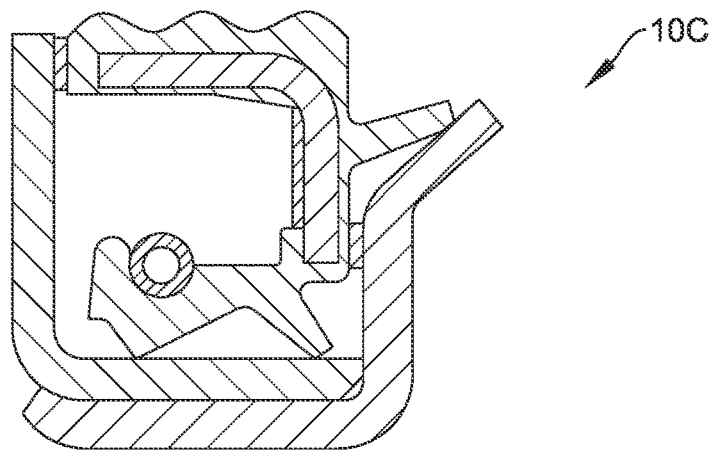
FIG. 3 is a cross section of another embodiment of a cassette seal.
Figure 4:
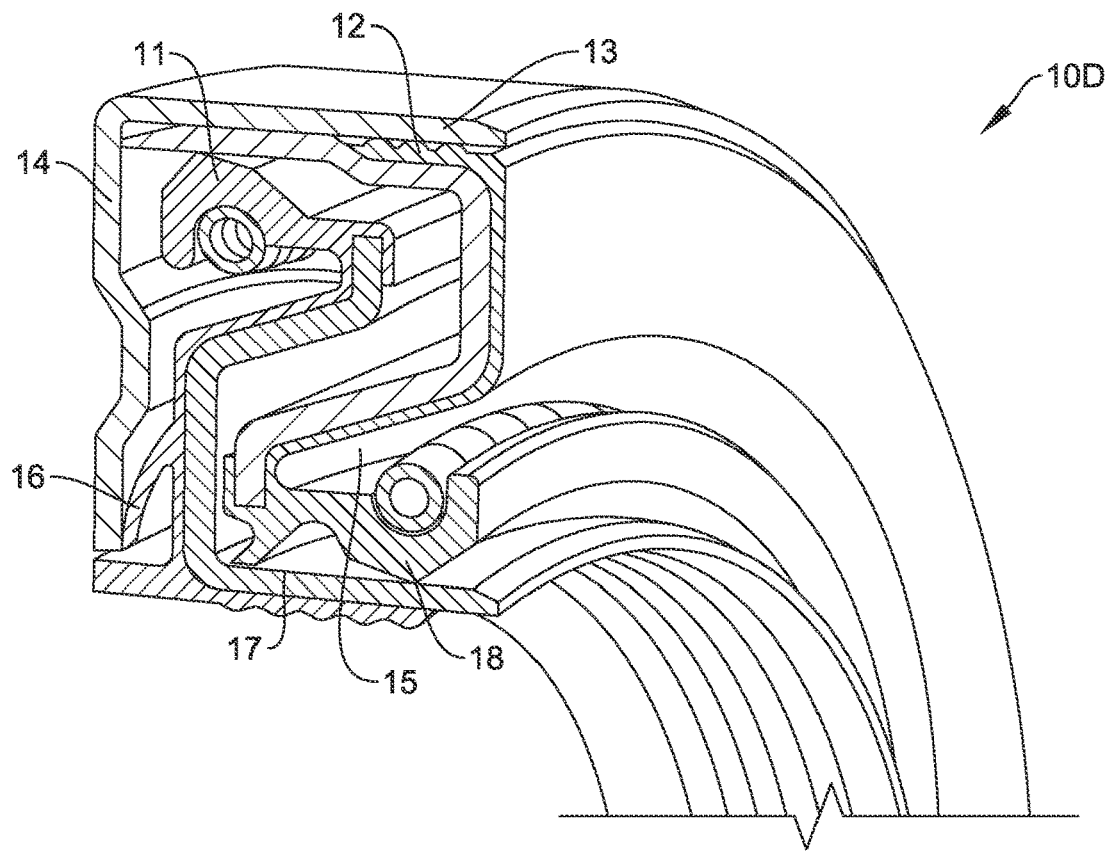
FIG. 4 is a sectional view taken from a perspective view of another embodiment of a cassette seal.
Figure 5:
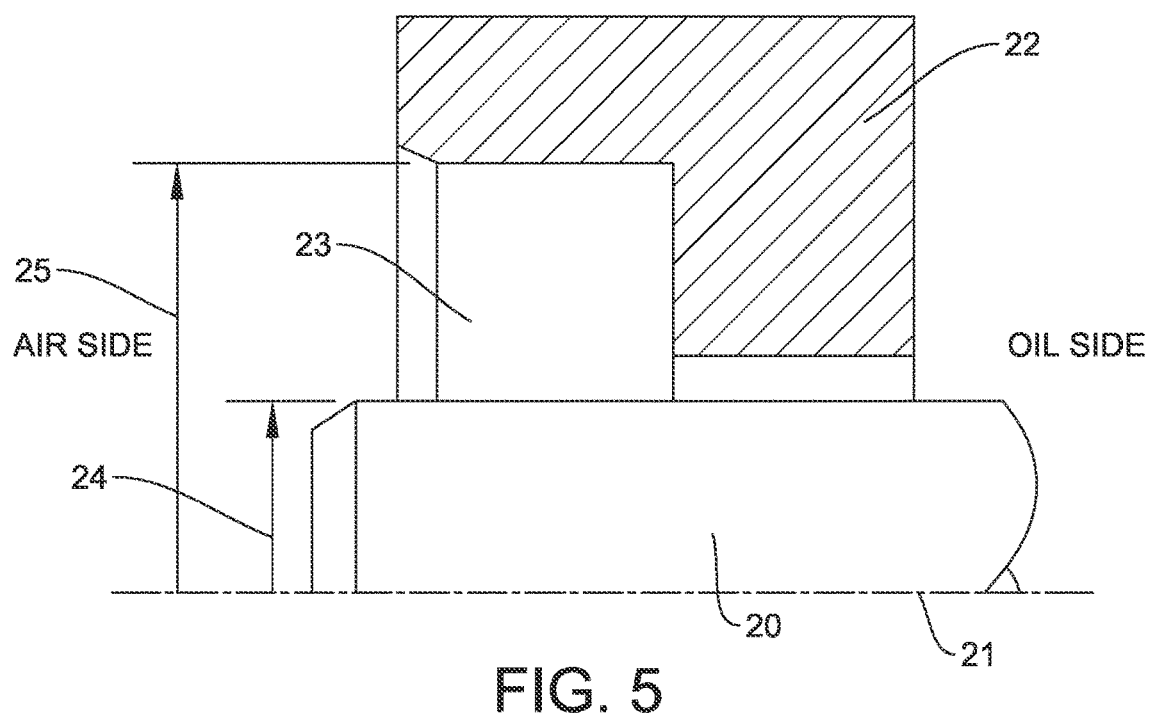
FIG. 5 is a sectional view of a simplistic shaft and housing for a cassette seal.
Figure 6A:
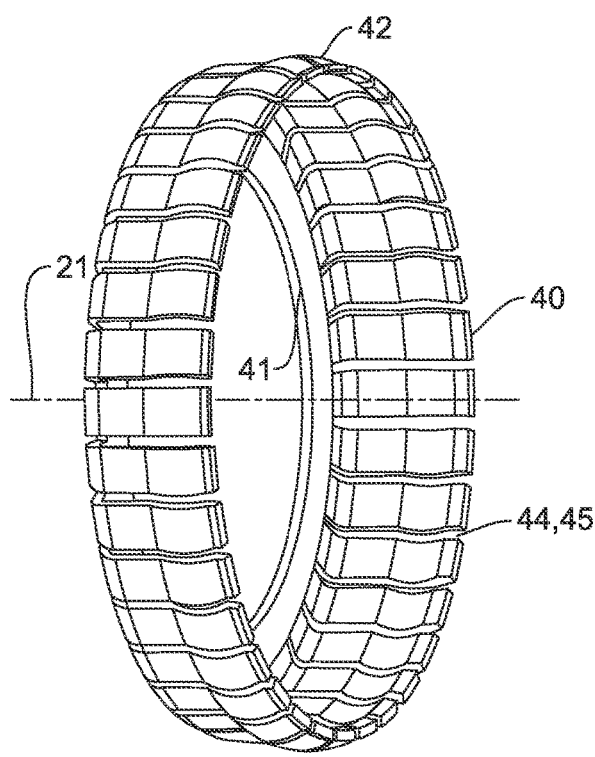
FIG. 6A is a perspective view of a plurality of cantilevered flexural fingers used in the electrically grounding cassette seal of the present invention.
Figure 6B:
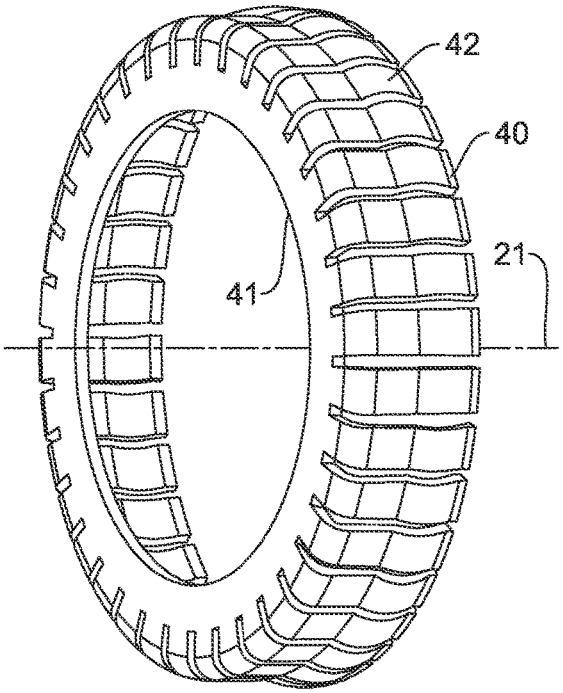
FIG. 6B is another perspective view of the structure of FIG. 6A.

FIGS. 6-10 show various embodiments of cantilevered flexural fingers used in the electrically grounding seal cassette 30 of the present invention. More specifically, FIGS. 6A-6B shows a plurality of cantilevered flexural fingers 40 attached to a common annular ring 41. The plurality of cantilevered flexural fingers and the common annular ring are centered and aligned around the longitudinal axis 21. It will be understood by those skilled in the art that any number of fingers could be used, whether that be 1, 2, 3 or any "n" number of fingers. Each finger 40 is outwardly cantilevered such that it can flex along its length when it is installed into the cassette seal of the present invention. Each finger may have an (optionally) integrally formed bump 42 that is configured to make contact with an abutting casing.

Figure 7A:
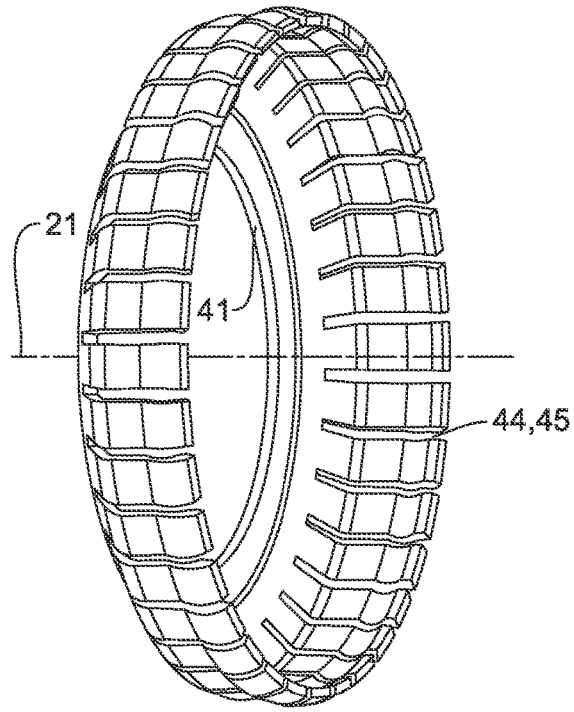
FIG. 7A is a perspective view of another embodiment of a plurality of cantilevered flexural fingers used in the electrically grounding cassette seal of the present invention.
Figure 7B:
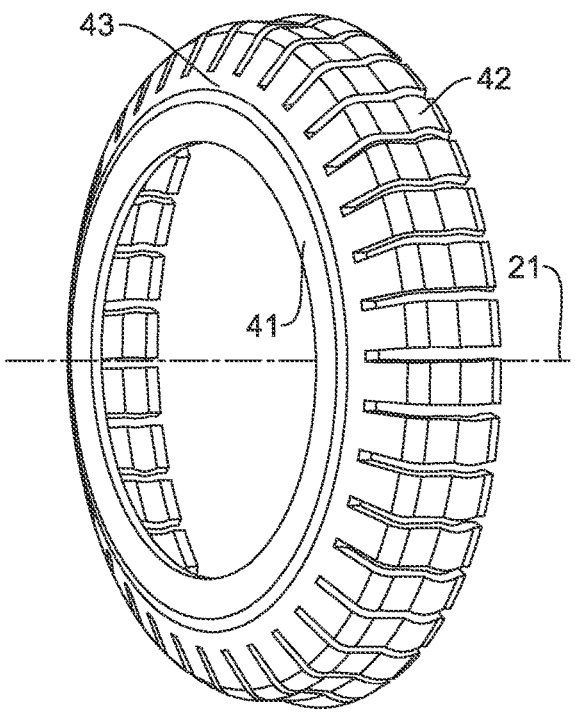
FIG. 7B is another perspective view of the structure of FIG. 7A.

FIGS. 7A-7B show another embodiment of a plurality of cantilevered flexural fingers where now the annular ring 41 and fingers 40 are partially angled 43. It will be understood by those skilled in the that the annular ring can take many forms and shapes as needed to fit within the cassette seal of the present invention.

Figure 8A:
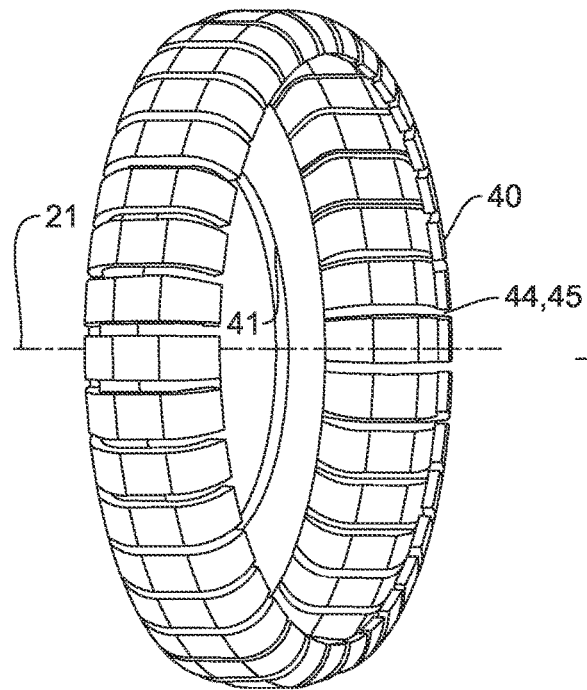
FIG. 8A is a perspective view of another embodiment of a plurality of cantilevered flexural fingers used in the electrically grounding cassette seal of the present invention.
Figure 8B:
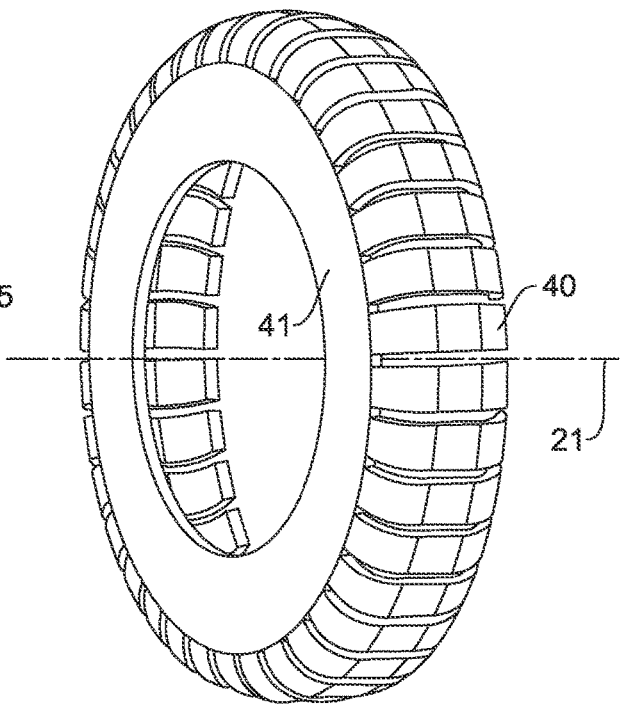
FIG. 8B is another perspective view of the structure of FIG. 8A.

FIGS. 8A-8B show another embodiment of a plurality of cantilevered flexural fingers where now the fingers are further curved inwards. As can be understood by those skilled in the art many shapes and configurations of the fingers are possible.

As can be seen in FIGS. 6, 7 and 8, there is a small gap 44 between each of the fingers. Accordingly, an electrically conductive grease 45 may be disposed between the plurality of cantilevered flexural fingers. This would aid in lubrication and prevent wear during use of the present invention.

Figure 9A:
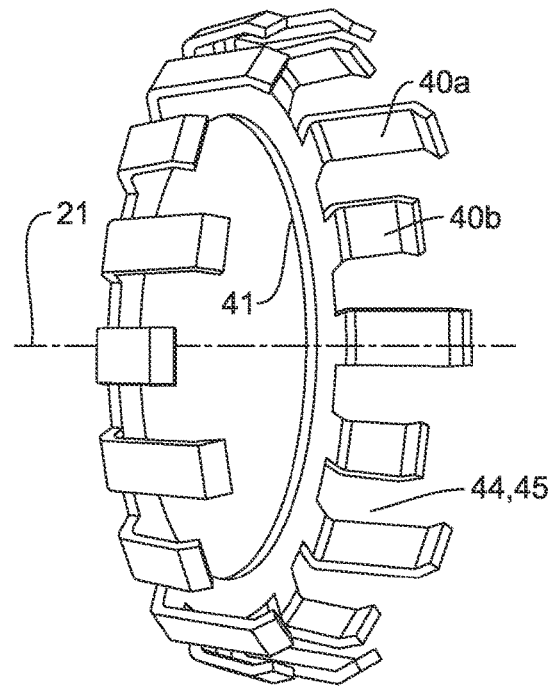
FIG. 9A is a perspective view of another embodiment of a plurality of cantilevered flexural fingers used in the electrically grounding cassette seal of the present invention.
Figure 9B:
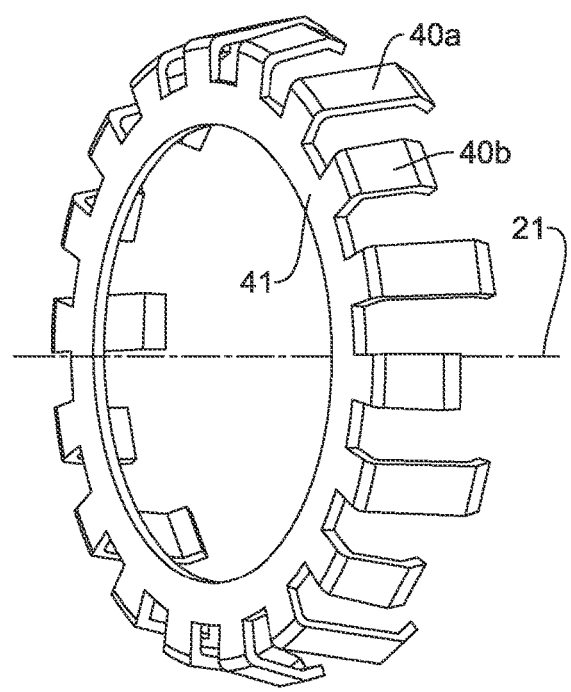
FIG. 9B is another perspective view of the structure of FIG. 9A.

FIGS. 9A-9B show another embodiment of a plurality of cantilevered flexural fingers. Here, fingers 40a are longer in length in comparison to fingers 40b. As shown herein there are two different lengths, but it will be understood by those skilled in the art that any number of different lengths could be used. For example 18 different lengths could have been used for the 18 different fingers. The differing lengths then allow for contact to be made at different locations, such that wear is then reduced during use of the present invention.

Figure 10:
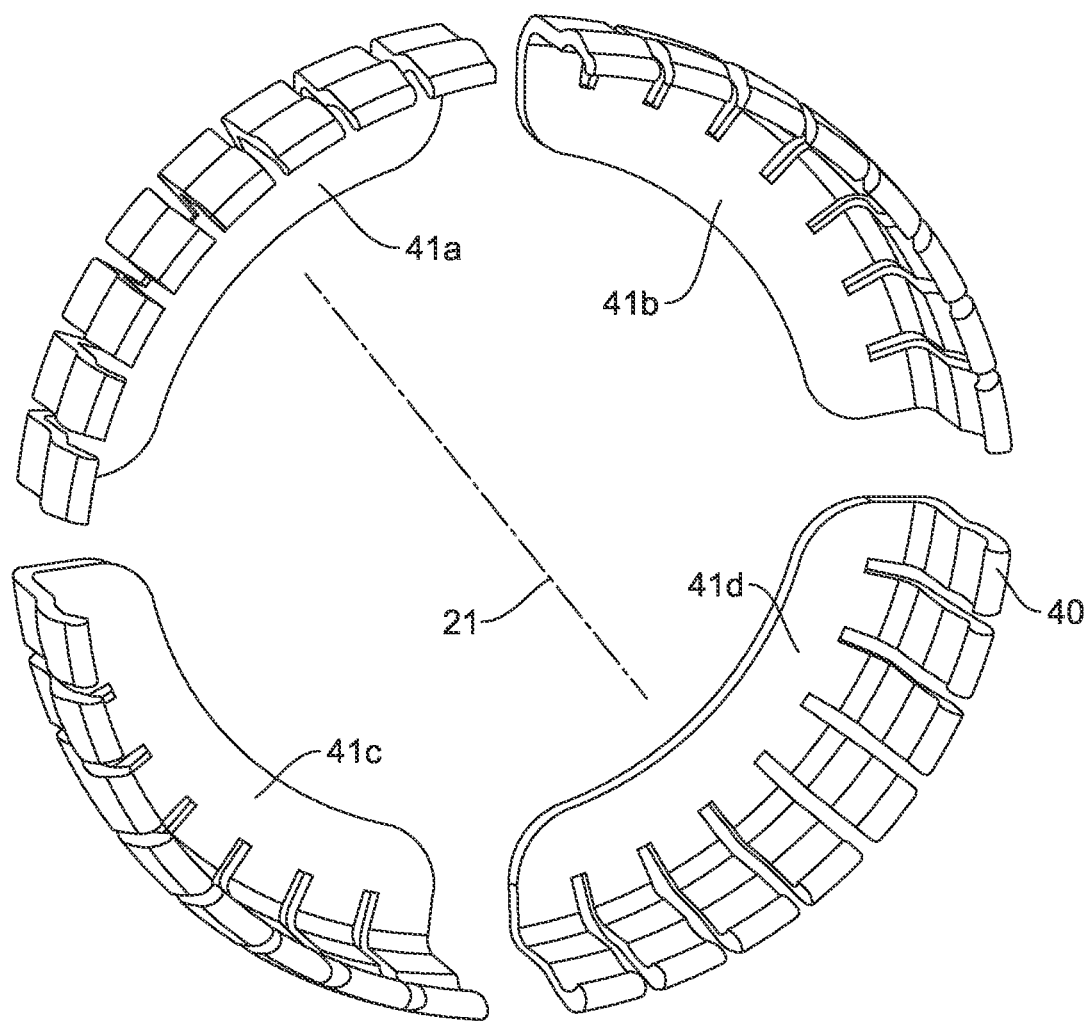
FIG. 10 is a perspective view of another embodiment of a plurality of cantilevered flexural fingers separated into segments which are then used in the electrically grounding cassette seal of the present invention.
Figure 11:
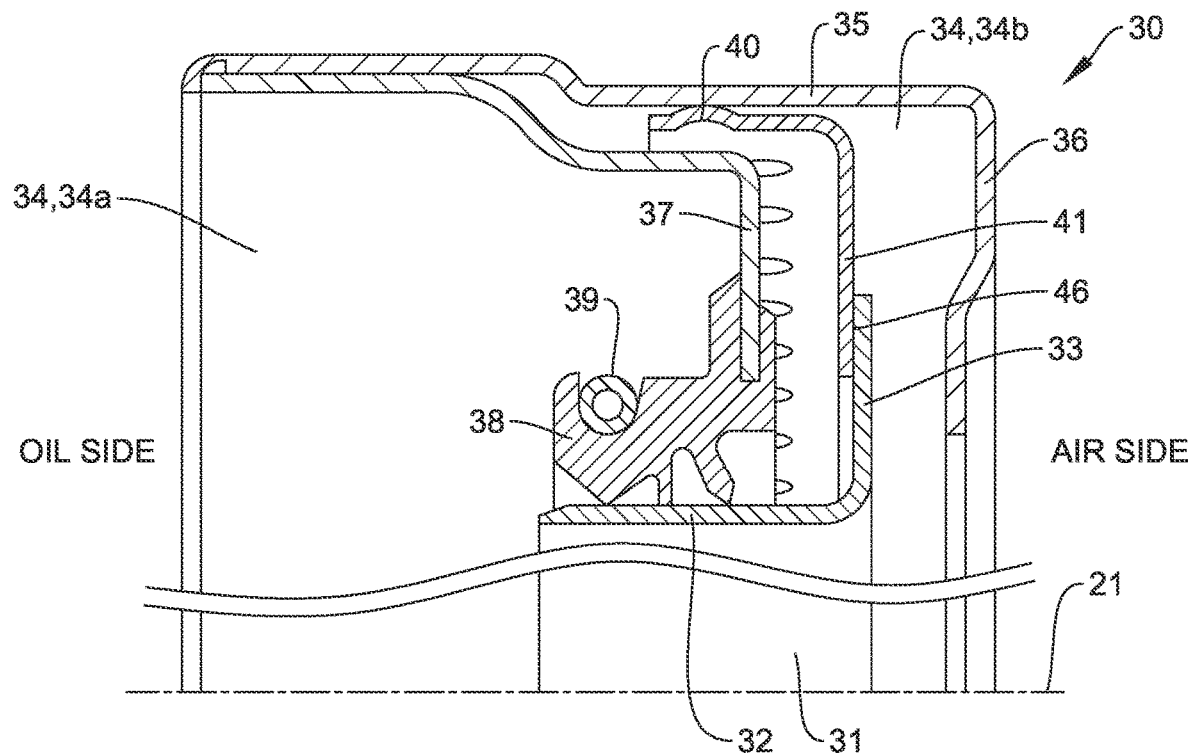
FIG. 11 is a sectional view of an electrically grounding cassette seal of the present invention.
Figure 12:
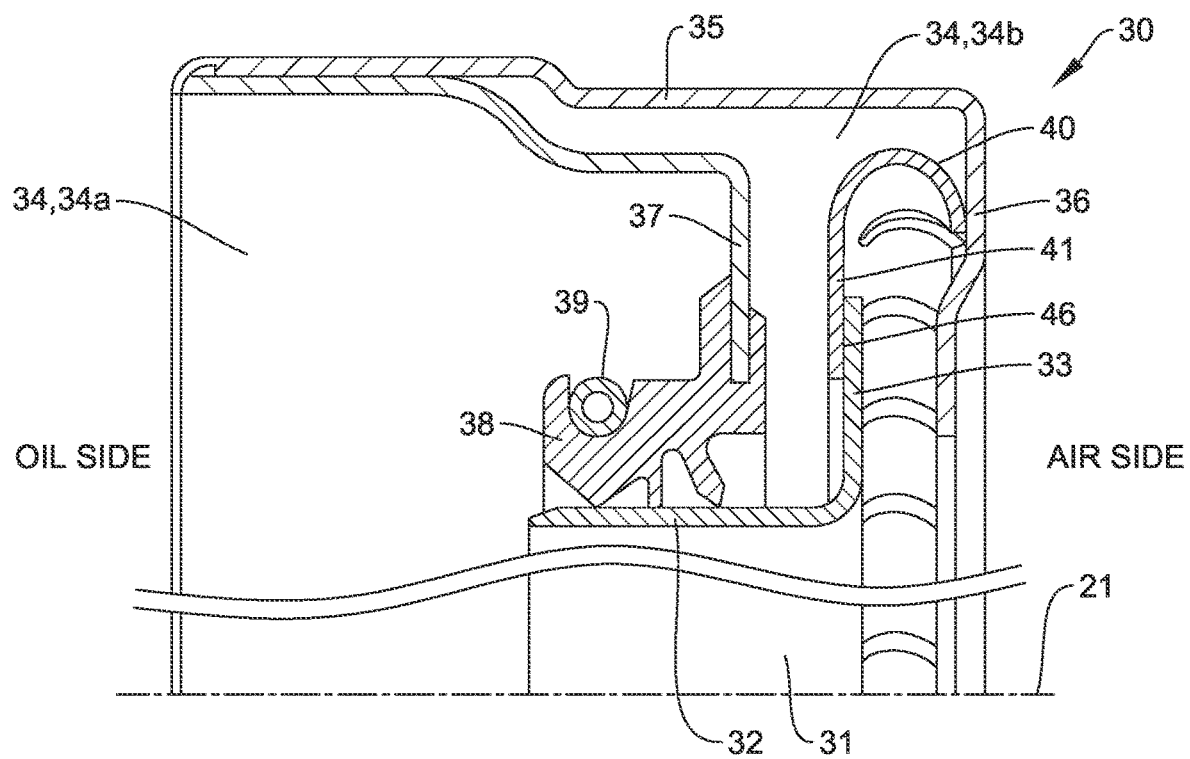
FIG. 12 is a sectional view of another embodiment of an electrically grounding cassette seal of the present invention.
Figure 13:
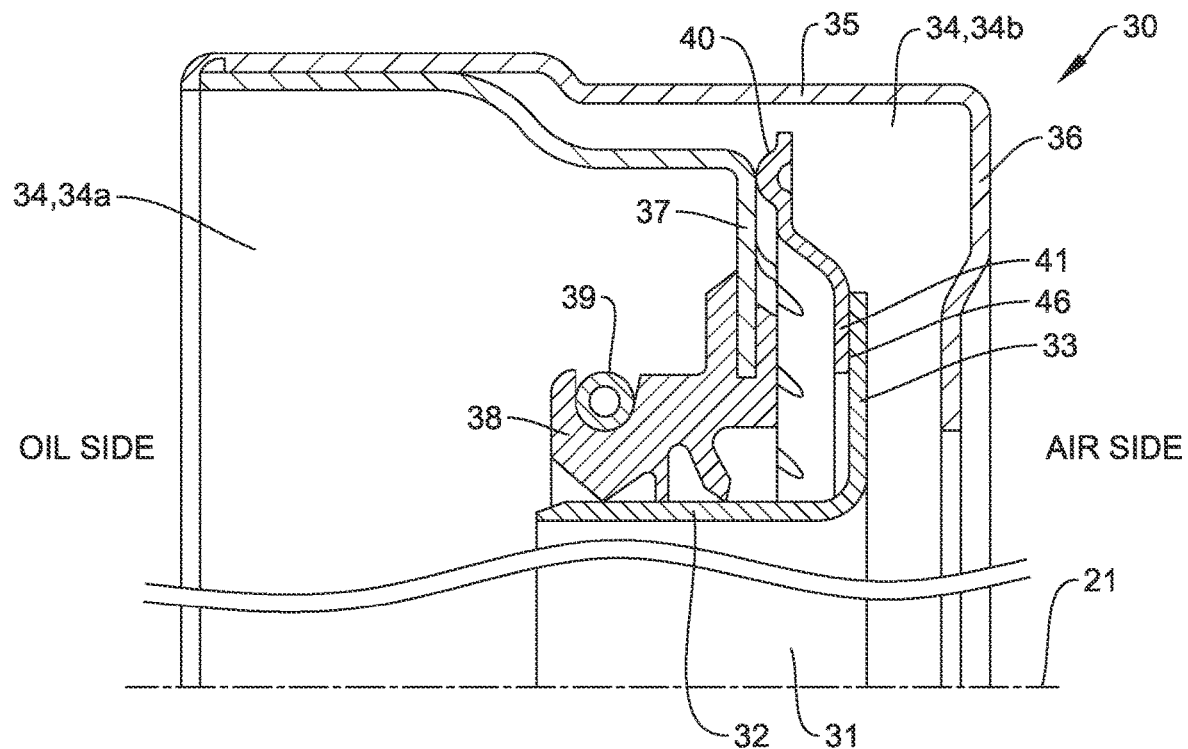
FIG. 13 is a sectional view of another embodiment of an electrically grounding cassette seal of the present invention.
Figure 14:
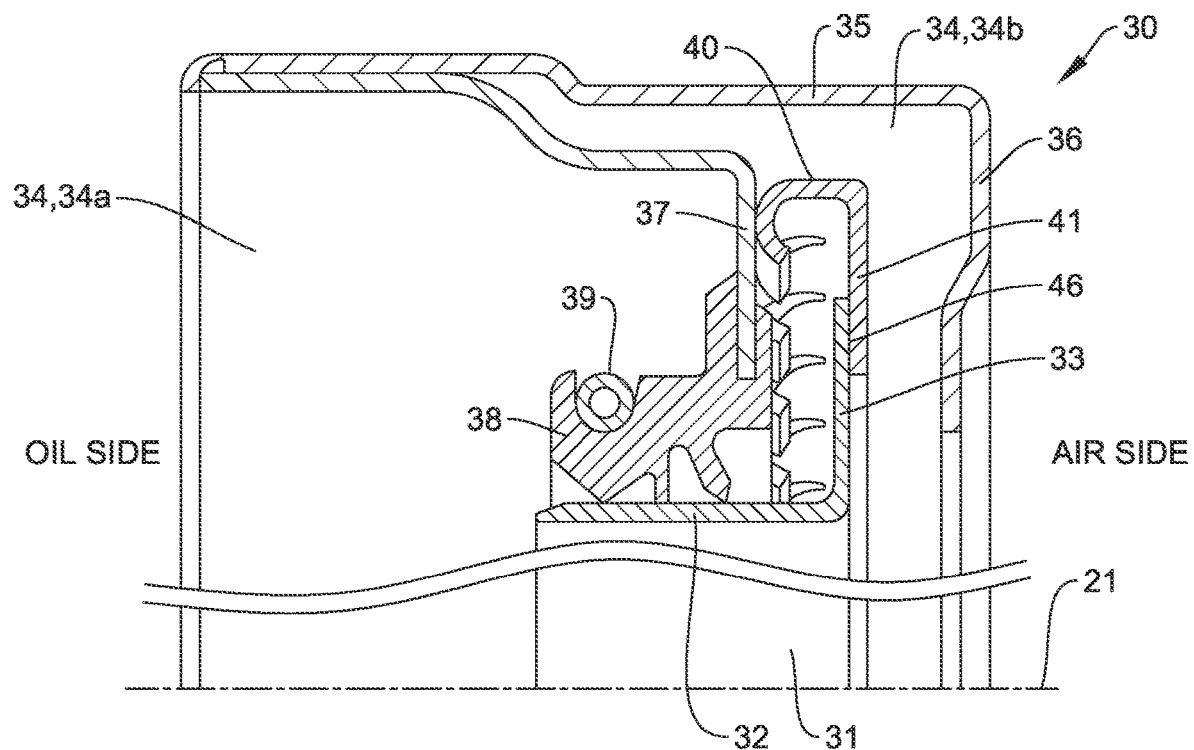
FIG. 14 is a sectional view of another embodiment of an electrically grounding cassette seal of the present invention.
Figure 15:
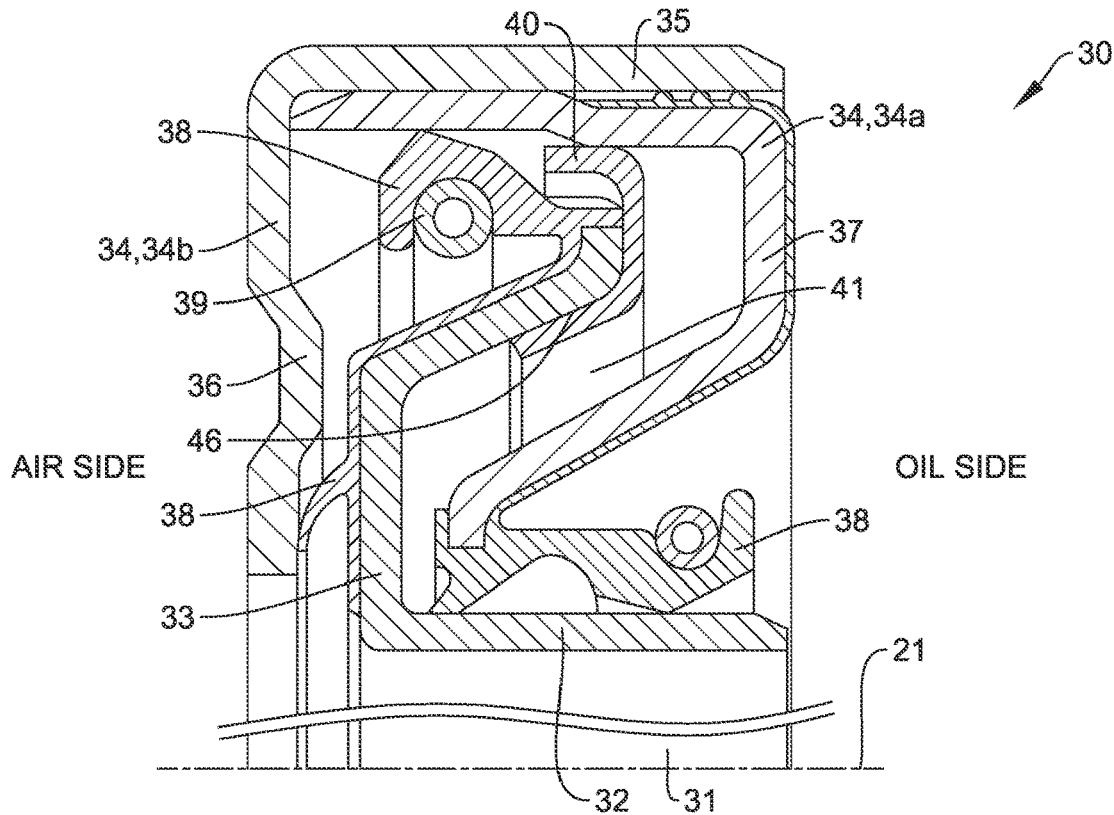
FIG. 15 is a sectional view of another embodiment of an electrically grounding cassette seal of the present invention.
Figure 16:
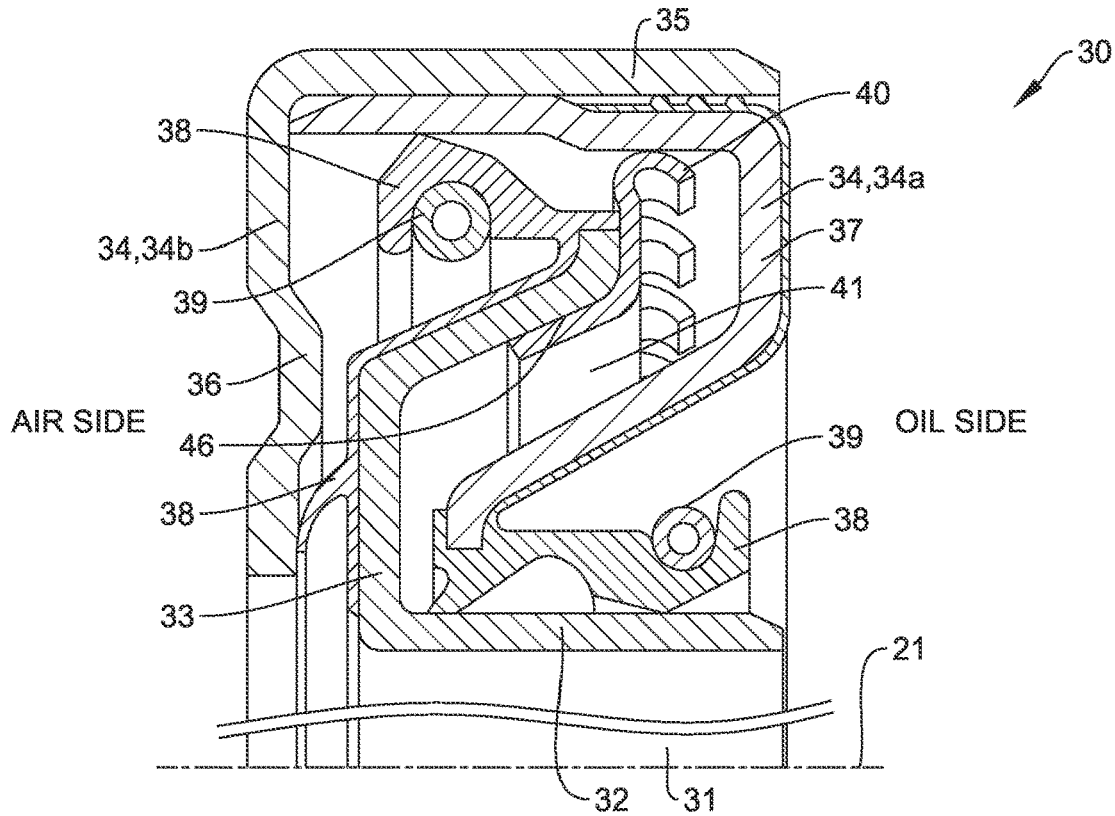
FIG. 16 is a sectional view of another embodiment of an electrically grounding cassette seal of the present invention.
Figure 17:
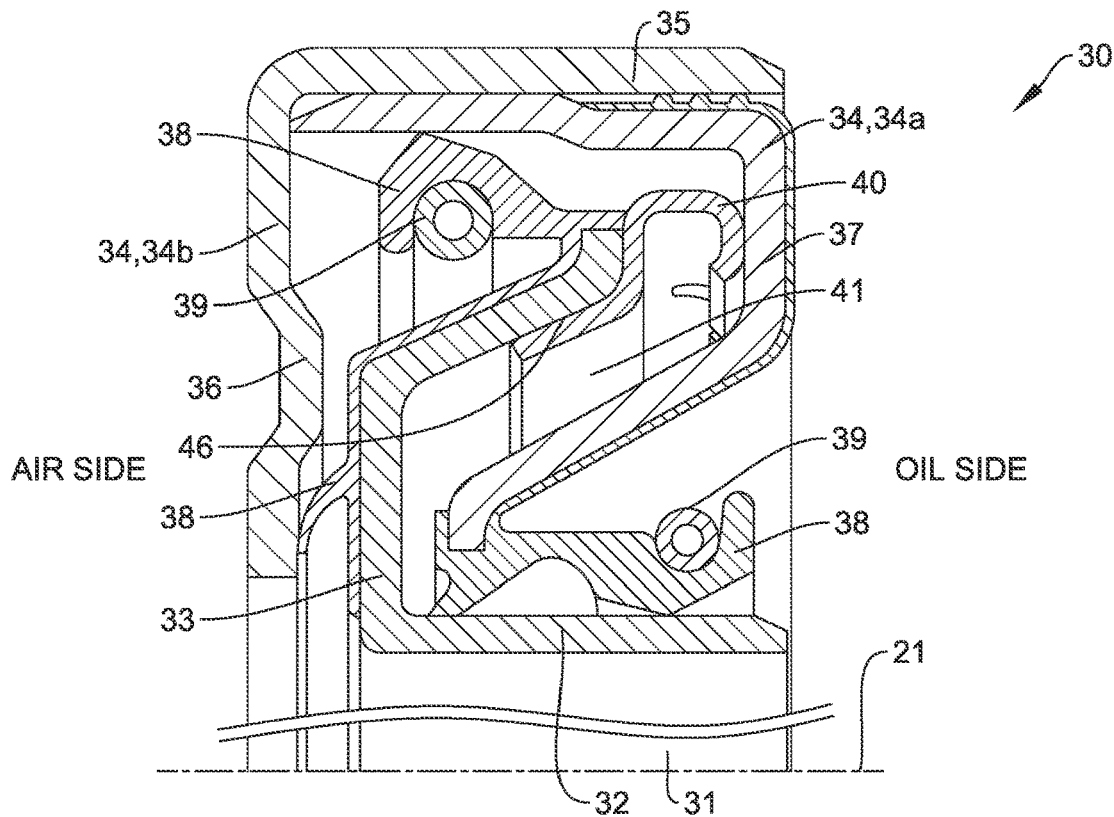
FIG. 17 is a sectional view of another embodiment of an electrically grounding cassette seal of the present invention.
Figure 18:
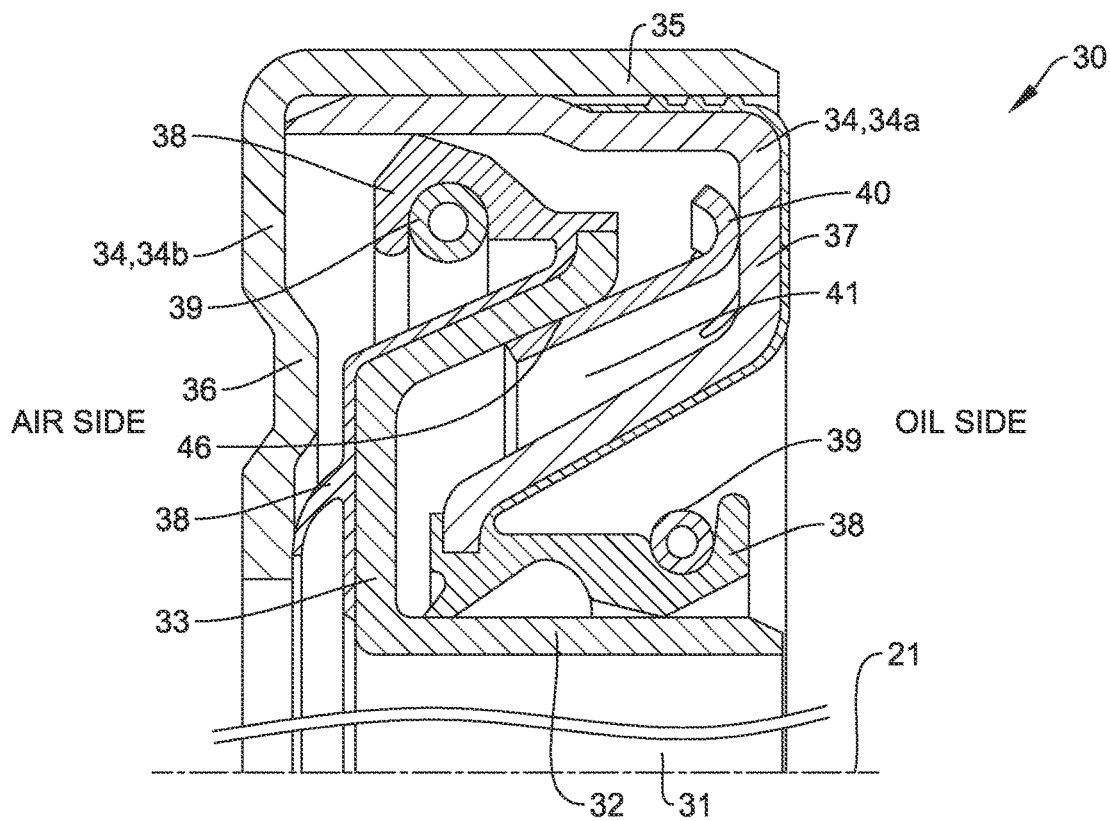
FIG. 18 is a sectional view of another embodiment of an electrically grounding cassette seal of the present invention.

FIG. 10 shows how the annular ring 41 may now be broken into segments 41a, 41b, 41c and 41d. As can be understood by those skilled in the art, any number of segments could be devised.

FIGS. 11-18 show various embodiments in cross section of the internally grounding cassette seal 30 of the present invention, where like numerals are used throughout. A shaft casing 31 (i.e. first structural member) is annularly-shaped (i.e. ring-shaped) about the longitudinal axis configured to fixedly attach to the shaft. The shaft casing is electrically conductive and configured to be in electrical conductivity with the shaft when attached to the shaft. The shaft casing comprises a first annularly-shaped portion 32 extending (horizontally in the figure) at least partially along (i.e. aligned with) the longitudinal axis. The shaft casing comprises a second annularly-shaped portion 33 extending (vertically in the figure) at least partially perpendicular to the longitudinal axis. Here, the first portion 32 and second portion 33 are integrally formed as one piece, but it is understood that they could have been made separately and thereafter joined.

A housing casing 34 (34a, 34b) (i.e. second structural member) is annularly-shaped (i.e. ring-shaped) about the longitudinal axis configured to fixedly attach to the housing. Similar to the shaft casing, the housing casing is electrically conductive and configured to be in electrical conductivity with the housing when attached to the housing. The housing casing comprises a first annularly-shaped portion 35 extending (horizontally in the figure) at least partially along (i.e. aligned with) the longitudinal axis. A second annularly-shaped portion 36 is extending (vertically in the figure) at least partially perpendicular to the longitudinal axis. A third annularly-shaped portion (37) is extending (vertically in the figure) at least partially perpendicular to the longitudinal axis.

The second annularly-shaped portion 36 of the housing casing is disposed adjacent to the air side of the cassette seal and the third annularly-shaped portion 37 of the housing casing is disposed adjacent to the oil side of the cassette seal. As can be seen in the figures, the second annularly-shaped portion 33 of the shaft casing is disposed between the second 36 and third 37 annularly-shaped portions of the housing casing.

Furthermore, it is understood that the housing casing may be made of one integrally formed part or, as shown herein, made from two different parts attached together. As shown herein, one can see that there is a first housing casing 34a that is then attached to a second housing casing 34b. The attachment may be made by an interference fit, a crimping, a fastener, a bonding, a rivet or any known connection method.

At least one seal 38 is disposed between the shaft casing and the housing casing. In actuality, there may be many seals used in the cassette seal of the present invention. The at least one seal is fixedly attached to either the shaft casing or the housing casing and then in rotating abutment with the other. The at least one seal or plurality of seals are configured to separate the oil side of the cassette seal from the air side of the cassette seal.

To help hold the seals against their respective parts, a bias 39 may be used. Such biases are well known to those skilled in the art and can include a garter spring, which is a coiled spring in a circular shape which exerts forces either radial inward or outward depending on the design. In the figure shown, the garter spring is exerting inward radial forces.

The shaft casing and the housing casing may be metallic. More specifically, the shaft casing and the housing casing may be steel, stainless steel or carbon steel.

The cantilevered flexural fingers may be made from an electrically conductive metal, an electrically conductive plastic or an electrically conductive rubber. More specifically, the cantilevered flexural finger may be made from brass.

As shown in FIGS. 11-18, the common annular ring 41 is attached to either the shaft casing or the housing casing by bonding, fasteners, rivets or an interference fit.

In another embodiment not shown, the fingers may be integrally formed as part of either the shaft casing or housing casing to reduce parts and simplify manufacturing.

Furthermore, the cantilevered flexural fingers are disposed within the cassette seal and are not visible from an outside of the cassette seal. This helps to protect the fingers from being interfered with during assembly or even during use. This means that the cantilevered flexural fingers are disposed between the shaft casing and the housing casing. More specifically, the cantilevered flexural fingers are disposed between the first annularly-shaped portions of the housing casing and shaft casing and are also disposed between the second annularly-shaped portion of the shaft casing and the third annularly-disposed housing casing. Also more specifically, the cantilevered flexural fingers are disposed between the first annularly-shaped portions of the housing casing and shaft casing and are also disposed between the second and the third annularly-disposed housing casings.

Although several embodiments have been described in detail for purposes of illustration, various modifications may be made to each without departing from the scope and spirit of the invention. Accordingly, the invention is not to be limited, except as by the appended claims.

NUMERALS 10 cassette seal
11 stacked design
12 outer diameter
13 metal cases
14 step
15 oil-facing lip
16 axial lip
17 fine finish
18 oil seal lip design
20 shaft
21 longitudinal axis
22 housing
23 annularly-shaped countersink, bore
24 outer diameter, shaft
25 outer diameter, bore
30 cassette seal, present invention
31 shaft casing
32 horizontal first portion, shaft casing
33 vertical second portion, shaft casing
34 housing casing
35 horizontal first portion, house casing
36 vertical second portion, housing casing, air side
37 vertical third portion, housing casing, oil side
38 seal
39 bias
40 cantilevered flexural finger
41 annular ring
42 bump, finger
43 angle, ring and fingers
44 gap, fingers
45 grease
46 bonding, fasteners, rivets, interference fit

What is claimed is:

1. A cassette seal for sealing a shaft within a housing, where either the shaft rotates relative to the housing or the housing rotates relative to the shaft about a longitudinal axis, the cassette seal mutually defining and annularly-shaped about the longitudinal axis, the cassette seal comprising:
    a shaft casing annularly-shaped about the longitudinal axis and configured to fixedly attach to the shaft, wherein the shaft casing is electrically conductive and configured to be in electrical contact with the shaft when attached to the shaft;
    a housing casing annularly-shaped about the longitudinal axis and configured to fixedly attach to the housing, wherein the housing casing is electrically conductive and configured to be in electrical contact with the housing when attached to the housing;
    at least one seal disposed between the shaft casing and the housing casing, the at least one seal fixedly attached to either the shaft casing or the housing casing and then in rotating abutment with the other, the at least one seal configured to separate an oil side of the cassette seal from an air side of the cassette seal;
    at least one cantilevered flexural finger fixedly attached to either the shaft casing or the housing casing and then in electrical abutment with the other, wherein the at least one cantilevered flexural finger is electrically conductive and electrically connects the shaft casing to the housing casing;
    wherein the shaft casing comprises a first annularly-shaped portion extending at least partially along the longitudinal axis and a second annularly-shaped portion extending at least partially perpendicular to the longitudinal axis;
    wherein the housing casing comprises a first annularly-shaped portion extending at least partially along the longitudinal axis, a second annularly-shaped portion extending at least partially perpendicular to the longitudinal axis, and a third annularly-shaped portion extending at least partially perpendicular to the longitudinal axis;
    wherein the second annularly-shaped portion and the third annularly-shaped portion of the housing casing extend at least partially perpendicular to the longitudinal axis at least a distance that is more in comparison to a thickness of the first annularly-shaped portion of the housing casing;
    wherein the second annularly-shaped portion and the third annularly-shaped portion of the housing casing are spaced a distance apart;
    wherein the second annularly-shaped portion of the housing casing is disposed closer to the air side of the cassette seal in comparison to the third annularly-shaped portion of the housing casing;
    wherein the third annularly-shaped portion of the housing casing is disposed closer to the oil side of the cassette seal in comparison to the second annularly-shaped portion of the housing casing; and
    wherein the second annularly-shaped portion of the shaft casing is disposed between the second and the third annularly-shaped portions of the housing casing.

2. The cassette seal of claim 1, wherein the shaft casing and/or the housing casing are metallic, steel, stainless steel or carbon steel.

3. The cassette seal of claim 1, wherein the at least one cantilevered flexural finger comprises an electrically conductive metal, an electrically conductive plastic or an electrically conductive rubber.

4. The cassette seal of claim 1, wherein the at least one cantilevered flexural finger comprises brass.

5. The cassette seal of claim 1, wherein the at least one cantilevered flexural finger comprises a plurality of cantilevered flexural fingers disposed about the longitudinal axis.

6. The cassette seal of claim 5, wherein the plurality of cantilevered flexural fingers extend outwardly from a common annular ring.

7. The cassette seal of claim 6, wherein the common annular ring is attached to either the shaft casing or the housing casing by bonding, fasteners, rivets or an interference fit.

8. The cassette seal of claim 5, wherein at least two different cantilevered flexural fingers of the plurality of cantilevered flexural fingers comprise different lengths.

9. The cassette seal of claim 5, including an electrically conductive grease disposed between the plurality of cantilevered flexural fingers.

10. The cassette seal of claim 1, wherein the housing casing and/or the shaft casing are made from more than one casing assembled together.

11. The cassette seal of claim 1, wherein the at least one cantilevered flexural finger is disposed between the shaft casing and the housing casing.

12. The cassette seal of claim 1, wherein the at least one cantilevered flexural finger is disposed within the cassette seal and is not visible from any portion outside of the cassette seal viewed from the air side or the oil side of the cassette seal before an installation to the shaft or the housing, wherein the air side and the oil side are the respective entire axial sides of the electrically grounding cassette seal, the respective entire axial sides being perpendicular to the longitudinal axis.

13. The cassette seal of claim 1, wherein the at least one cantilevered flexural finger is disposed between the first annularly-shaped portions of the housing casing and shaft casing.

14. The cassette seal of claim 1, wherein the at least one cantilevered flexural finger is disposed between the second and the third annularly-shaped portions of the housing casing.

15. An electrically grounding cassette seal for sealing a shaft within a housing, where either the shaft rotates relative to the housing or the housing rotates relative to the shaft about a longitudinal axis, the electrically grounding cassette seal mutually defining and annularly-shaped about the longitudinal axis, the electrically grounding cassette seal comprising:
   a shaft casing annularly-shaped about the longitudinal axis configured to fixedly attach to the shaft, wherein the shaft casing is electrically conductive and configured to be in electrical contact with the shaft when attached to the shaft;
   a housing casing annularly-shaped about the longitudinal axis configured to fixedly attach to the housing, wherein the housing casing is electrically conductive and configured to be in electrical contact with the housing when attached to the housing;
   at least one seal disposed between the shaft casing and the housing casing, the at least one seal fixedly attached to either the shaft casing or the housing casing and then in rotating abutment with the other, the at least one seal configured to separate an oil side of the electrically grounding cassette seal from an air side of the electrically grounding cassette seal; and
   a plurality of cantilevered flexural fingers disposed about the longitudinal axis extending outwardly from a common annular ring, where the plurality of cantilevered flexural fingers through the common annular ring are fixedly attached to either the shaft casing or the housing casing and then the plurality of cantilevered flexural fingers are in electrical abutment with the other of the shaft casing or the housing casing, wherein the plurality of cantilevered flexural fingers and common annular ring are electrically conductive and electrically connect the shaft casing to the housing casing;
   wherein the plurality of cantilevered flexural fingers are disposed within the electrically grounding cassette seal and are not visible from any portion outside of the cassette seal viewed from the air side or the oil side of the electrically grounding cassette seal before an installation to the shaft or the housing, wherein the air side and the oil side are the respective entire axial sides of the electrically grounding cassette seal, the respective entire axial sides being disposed perpendicular to the longitudinal axis.

16. The electrically grounding cassette seal of claim 15, wherein the common annular ring is attached to either the shaft casing or the housing casing by bonding, fasteners, rivets or an interference fit.

17. The electrically grounding cassette seal of claim 15, wherein at least two different cantilevered flexural fingers of the plurality of cantilevered flexural fingers comprise different lengths.

18. The electrically grounding cassette seal of claim 15, including an electrically conductive grease disposed between the plurality of cantilevered flexural fingers.

19. The electrically grounding cassette seal of claim 15, wherein, when the plurality of cantilevered flexural fingers through the common annular ring are fixedly attached to the shaft casing, at least a portion of the plurality of cantilevered flexural fingers, in a direction along the longitudinal axis, are disposed between a first housing portion and a second housing portion of the housing casing extending perpendicular to the longitudinal axis.

20. The electrically grounding cassette seal of claim 15, wherein, when the plurality of cantilevered flexural fingers through the common annular ring are fixedly attached to the housing casing, at least a portion of the plurality of cantilevered flexural fingers, in a direction along the longitudinal axis, are disposed between a first shaft portion and a second shaft portion of the shaft casing extending perpendicular to the longitudinal axis.

21. A cassette seal for sealing a shaft within a housing, where either the shaft rotates relative to the housing or the housing rotates relative to the shaft about a longitudinal axis, the cassette seal mutually defining and annularly-shaped about the longitudinal axis, the cassette seal comprising:
   a shaft casing annularly-shaped about the longitudinal axis configured to fixedly attach to the shaft, wherein the shaft casing is electrically conductive and configured to be in electrical contact with the shaft when attached to the shaft;
   a housing casing annularly-shaped about the longitudinal axis configured to fixedly attach to the housing, wherein the housing casing is electrically conductive and configured to be in electrical contact with the housing when attached to the housing;
   at least one seal disposed between the shaft casing and the housing casing, the at least one seal fixedly attached to either the shaft casing or the housing casing and then in rotating abutment with the other, the at least one seal configured to separate an oil side of the cassette seal from an air side of the cassette seal; and
   at least one cantilevered flexural finger fixedly attached to either the shaft casing or the housing casing and then in direct rotating abutment with the other, wherein the at least one cantilevered flexural finger is electrically conductive and electrically connects the shaft casing to the housing casing;
   wherein the shaft casing comprises a first annularly-shaped portion extending at least partially along the longitudinal axis and a second annularly-shaped portion extending at least partially perpendicular to the longitudinal axis;
   wherein the housing casing comprises a first annularly-shaped portion extending at least partially along the longitudinal axis, a second annularly-shaped portion extending at least partially perpendicular to the longitudinal axis, and a third annularly-shaped portion extending at least partially perpendicular to the longitudinal axis, wherein the second annularly-shaped portion of the housing casing is disposed adjacent to the air side of the cassette seal and the third annularly-shaped portion of the housing casing is disposed adjacent to the oil side of the cassette seal, and wherein the second annularly-shaped portion of the shaft casing is disposed between the second and third annularly-shaped portions of the housing casing;

wherein the second annularly-shaped portion and the third annularly-shaped portion of the housing casing extend at least partially perpendicular to the longitudinal axis at least a distance that is more in comparison to a thickness of the first annularly-shaped portion of the housing casing; and wherein the at least one cantilevered flexural finger is disposed within the cassette seal and is not visible from an outside of the cassette seal.

22. The cassette seal of claim 21, wherein the at least one cantilevered flexural finger is disposed between the first annularly-shaped portions of the housing casing and shaft casing.

23. The cassette seal of claim 21, wherein the at least one cantilevered flexural finger is disposed between the second and the third annularly-shaped portions of the housing casings.

24. The cassette seal of claim 21, wherein the second annularly-shaped portion and the third annularly-shaped portion of the housing casing are spaced a distance apart.

\* \* \* \* \*